United States Patent
Krishnaswamy et al.

(10) Patent No.: US 10,061,609 B2
(45) Date of Patent: *Aug. 28, 2018

(54) METHOD AND SYSTEM USING EXCEPTIONS FOR CODE SPECIALIZATION IN A COMPUTER ARCHITECTURE THAT SUPPORTS TRANSACTIONS

(71) Applicant: Intel Corporation, Santa Clara, CA (US)

(72) Inventors: Arvind Krishnaswamy, San Jose, CA (US); Daniel M. Lavery, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/339,418

(22) Filed: Oct. 31, 2016

(65) Prior Publication Data

US 2017/0046165 A1    Feb. 16, 2017

Related U.S. Application Data

(62) Division of application No. 13/976,046, filed on Jun. 26, 2013, now Pat. No. 9,483,275.

(51) Int. Cl.
    *G06F 9/30*    (2018.01)
    *G06F 9/46*    (2006.01)
    *G06F 8/36*    (2018.01)

(52) U.S. Cl.
    CPC .............. *G06F 9/467* (2013.01); *G06F 8/36* (2013.01)

(58) Field of Classification Search
    None
    See application file for complete search history.

(56) References Cited

U.S. PATENT DOCUMENTS

| 8,458,403 B2 | 6/2013 | Kessler |
| 8,560,816 B2 | 10/2013 | Moir et al. |
| 8,688,661 B2 | 4/2014 | Greiner et al. |
| 2004/0181784 A1 | 9/2004 | Kuwabara et al. |
| 2007/0043934 A1 | 2/2007 | Sodani et al. |
| 2007/0143276 A1 | 6/2007 | Harris |
| 2007/0156780 A1 | 7/2007 | Saha et al. |

(Continued)

FOREIGN PATENT DOCUMENTS

| CN | 101501636 A | 8/2009 |
| CN | 101542437 A | 9/2009 |

(Continued)

OTHER PUBLICATIONS

Japanese Office Action and English Translation for Application No. 2014-547162, dated Jun. 2, 2015, 5 pages.

(Continued)

*Primary Examiner* — Corey S Faherty
(74) *Attorney, Agent, or Firm* — Barnes & Thornburg LLP

(57) ABSTRACT

A method and system uses exceptions for code specialization in a system that supports transactions. The method and system includes inserting one or more branchless instructions into a sequence of computer instructions. The branchless instructions include one or more instructions that are executable if a commonly occurring condition is satisfied and include one or more instructions that are configured to raise an exception if the commonly occurring condition is not satisfied.

19 Claims, 5 Drawing Sheets

(56) References Cited

U.S. PATENT DOCUMENTS

| | | | |
|---|---|---|---|
| 2008/0126764 A1 | 5/2008 | Youfeng et al. |
| 2008/0244544 A1 | 10/2008 | Neelakantam et al. |
| 2010/0122073 A1 | 5/2010 | Narayanaswamy et al. |
| 2010/0262813 A1 | 10/2010 | Brown et al. |
| 2011/0214016 A1 | 9/2011 | Gschwind |

FOREIGN PATENT DOCUMENTS

| | | |
|---|---|---|
| CN | 101950259 A | 1/2011 |
| WO | 2013089767 A1 | 6/2013 |

OTHER PUBLICATIONS

Neelakantam, et al., "A Real System Evaluation of Hardware Atomicity for Software Speculation," Proceedings of the Fifteenth Edition of ASPLOS on Architectural Support for Programming Languages and Operating Systems, 2010, 10 pages.

Su et al., "Speculative Optimization Using Hardware-Monitored Guarded Regions for Java Virtual Machines," ACM Proceedings of the 3rd International Conference on Virtual Execution Environments, 2007, 11 pages.

Almog et al., "Specialized Dynamic Optimizations for High-Performance Energy-Efficient Microarchitecture," IEEE Proceedings of the Internationals Symposium of Code Generation and Optimization, 2004, 12 pages.

Patel et al., "rePlay: A Hardware Framework for Dynamic Optimization," IEEE Transactions on Computers, Jun. 2001, 19 pages.

PCT International Search Report and Written Opinion received for International Patent Application No. PCT/US2011/065391, dated Jul. 24, 2012, 11 pages.

Office Action and English Translation for Korean Patent Application No. 10-2014-7015915, dated Jul. 14, 2017, 6 pages.

Office Action and English Translation for Japanese Patent Application No. 2014-547162, dated Sep. 29, 2015, 14 pages.

Chinese Office Action for Patent Application No. 201180075572.0, dated Aug. 1, 2016, 6 pages.

European Search Report for Patent Application No. 11877535.2-1954/2791785, dated Dec. 15, 2016, 8 pages.

METHOD AND SYSTEM USING EXCEPTIONS FOR CODE SPECIALIZATION IN A COMPUTER ARCHITECTURE THAT SUPPORTS TRANSACTIONS

CROSS-REFERENCE TO RELATED APPLICATION

The present application is a divisional application of U.S. application Ser. No. 13/976,046, entitled "METHOD AND SYSTEM USING EXCEPTIONS FOR CODE SPECIALIZATION INA COMPUTER ARCHITECTURE THAT SUPPORTS TRANSACTIONS," which was filed on Jun. 26, 2013.

BACKGROUND

Some computer architectures can support hardware and/or software transactional memory systems, such as Restricted Transactional Memory (RTM) systems and Software Transactional Memory (STM) systems. In transactional memory systems, computer instructions are permitted to execute concurrently, e.g. as single-threaded operations of a multi-threaded application. To do this, sequences of instructions in the computer program are defined as transactions, which can execute read and write instructions to shared memory independently of instructions running on other threads. The transactions can be defined by an interpreter, translator, program compiler, optimizer, or application programming interface (API), for example, depending on the type of transactional system.

The transactional memory system includes control mechanisms to prevent concurrently executing instructions from accessing shared memory at the same time or in the wrong order. For example, a validation mechanism verifies that a transaction has successfully completed, e.g., without other program threads making changes to memory accessed by the transaction before the transaction completed. If the validation is successful, the results of the transaction are made permanent (e.g. by a "commit" operation).

If the transaction cannot be committed, an exception may be raised or the transaction may be aborted. If an exception is raised or the transaction is aborted, execution of the transaction can be rolled back to an earlier point in the program code, e.g., to a "checkpoint." If the transaction is aborted, it may be re-executed from the beginning until it completes successfully, or simply terminated.

Computer program code can contain many specialized instructions, each of which may be designed to handle a particular condition that may be satisfied during execution of the program. Code specialization is a program optimization technique that attempts to, at run-time, optimize a computer program or portion thereof for a commonly occurring condition. However, code specialization typically adds branch instructions that can affect performance.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
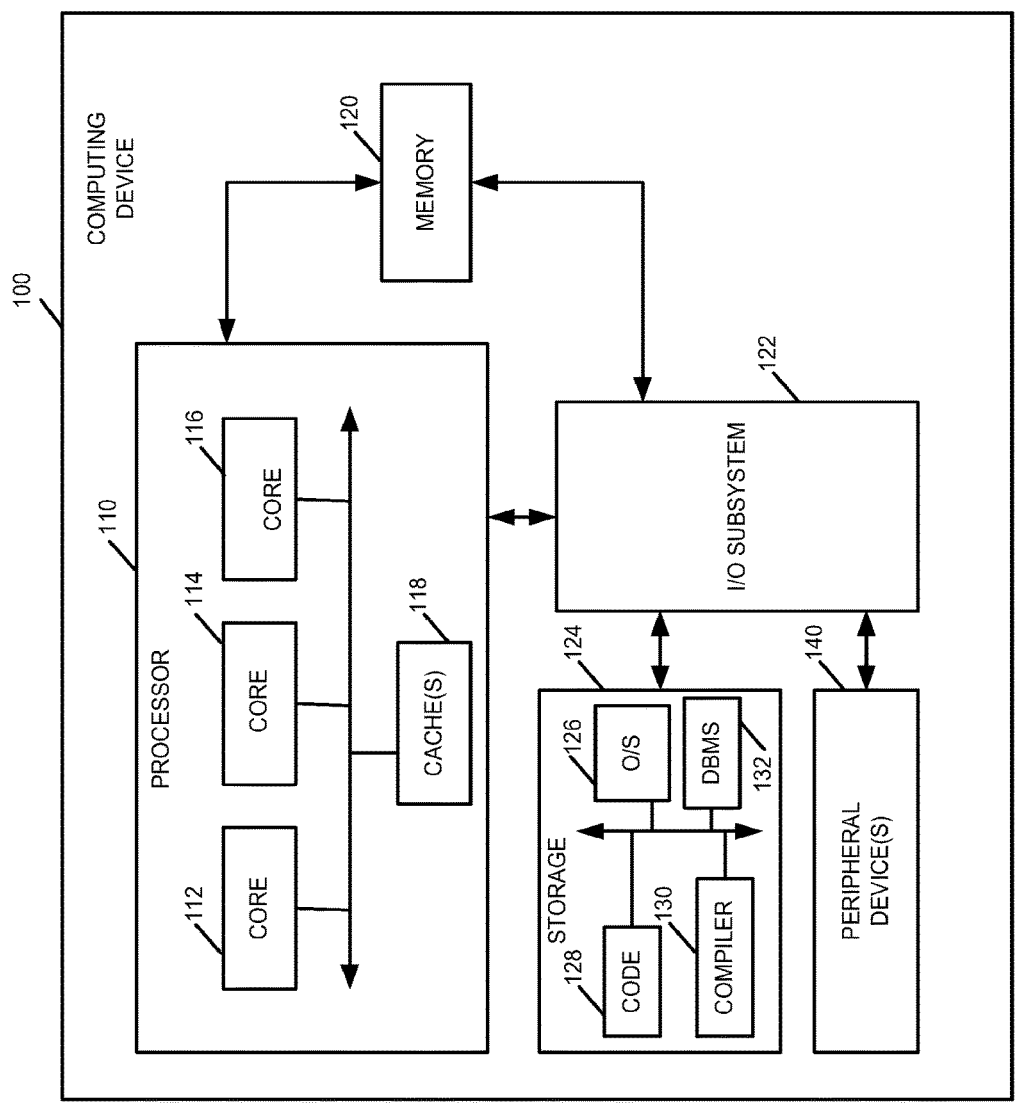
FIG. 1 is a simplified block diagram of at least one embodiment of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 2:
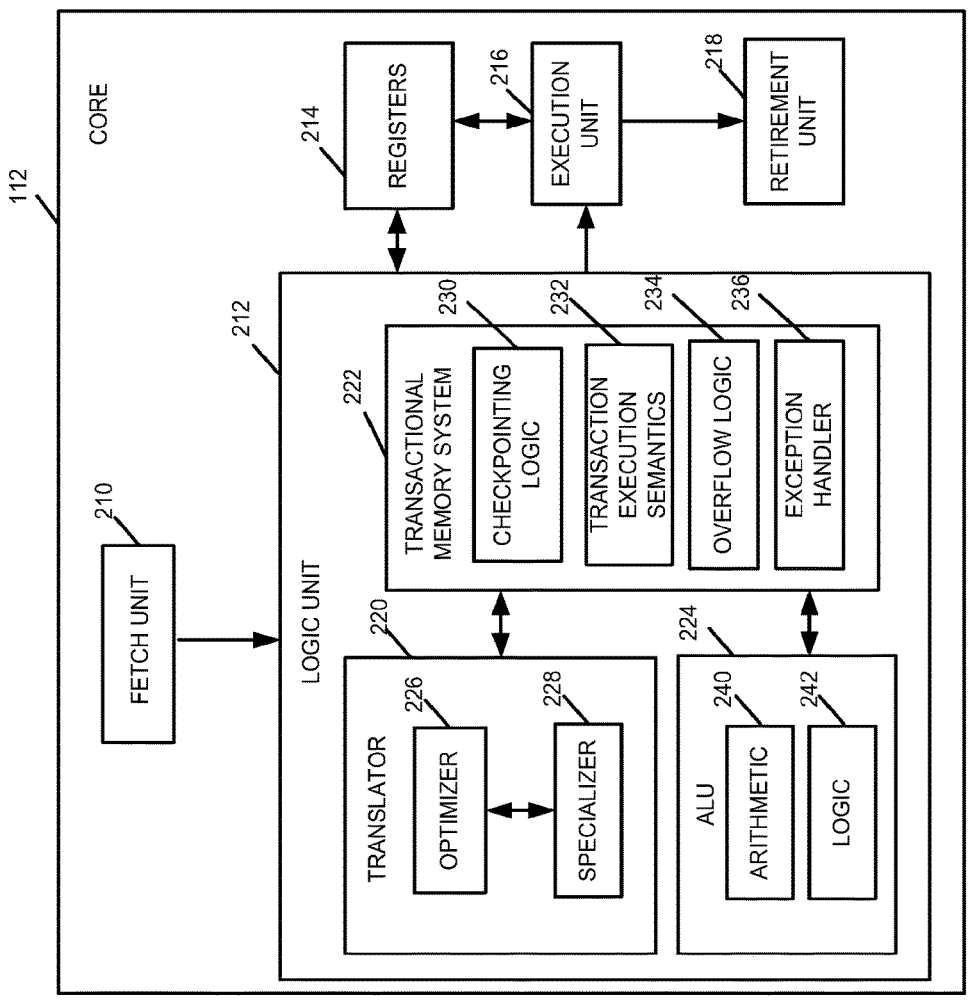
FIG. 2 is a simplified block diagram of at least one embodiment of a processor core of the computing device of FIG. 1.

Referring now to FIG. 1, an illustrative computing device 100 includes at least one processor 110, a memory 120, an input/output (I/O) subsystem 122, a storage device 124, and one or more peripheral devices 140. The processor 110 supports a transactional memory system 222 as shown in FIG. 2. As described in more detail below, computer program code is analyzed during execution. A specializer 228 interfaces with the transactional memory system 222 to specialize code regions or transactions for one or more commonly occurring conditions. Rather than adding branch instructions to the program code, as is often done when conventional code specialization techniques are employed, the specializer 228 inserts one or more branchless instructions in the code region or transaction that are configured to utilize the exception handling features of the transactional memory system 222. More specifically, the instruction(s) inserted by the specializer 228 are configured to raise an exception if a commonly occurring condition is not satisfied. In this way, the normal program flow is allowed to continue uninterrupted, and without branching, in response to the commonly occurring condition being satisfied.

The computing device 100 may be embodied in or as any type of computing device, such as, for example, a desktop computer system, a laptop or tablet computer system, a server, an enterprise computer system, a network of computers, a handheld computing device, or other electronic device depending on the particular application.

The illustrative processor 110 includes multiple processor cores or logical sections of a single core, 112, 114, 116, which are referred to herein simply as "cores" for ease of description. One or more of the cores 112, 114, 116 can be configured to process multi-threaded computer programs. The cores 112, 114, 116 include or are communicatively coupled to one or more cache memory 118. The cache 118 may be utilized to temporarily store data and/or instructions during operation of the specializer 228 and/or other components of the computing device 100.

In addition to the cache memory 118, the processor 110 and/or its cores 112, 114, 116 include, or are otherwise communicatively coupled to, the memory 120. Portions of the memory 120 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The processor 110 is also communicatively coupled to the I/O subsystem 122. Although not specifically shown, the I/O subsystem 122 typically includes a memory controller (e.g., a memory controller hub (MCH) or northbridge), an input/output controller (e.g., an input/output controller hub (ICH) or southbridge), and a firmware device. Of course, in other embodiments, I/O subsystems having other configurations may be used. For example, in some embodiments, the I/O subsystem 122 may form a portion of a system-on-a-chip (SoC) and be incorporated, along with the processor 110 and other components of the computing device 100, on a single integrated circuit chip. As such, it will be appreciated that each component of the I/O subsystem 122 may be located on a common integrated circuit chip in some embodiments.

The I/O subsystem 122 is communicatively coupled to one or more storage devices 124. Portions of the storage 124 may be embodied as any suitable device for storing data and/or instructions, such as disk storage (e.g. hard disks), memory cards, memory sticks, and/or others. In some embodiments, an operating system (O/S) 126, one or more sequences of program code (e.g., application code) 128, a program compiler 130 and/or a database management system (DBMS) 132 may be embodied in the storage 124. During execution, portions of the O/S 126, code 128, compiler 130 and/or DBMS 132 may be loaded into the memory 120 and/or the cache 118, for faster processing or other reasons.

The I/O subsystem 122 may be communicatively coupled to one or more peripheral devices 140. The peripheral device(s) 140 may include one or more network interfaces, graphics and/or video adaptors, keyboard, touchscreens, displays, printers, data storage devices, and/or other peripheral devices, depending upon, for example, the intended use of the computing device 100. Further, it should be appreciated that the computing device 100 may include other components, sub-components, and devices not illustrated in FIG. 1 for clarity of the description.

In general, the components of the computing device 100 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

Referring now to FIG. 2, the illustrative processor core 112 includes a fetch unit 210, a logic unit 212, one or more registers 214, an execution unit 216, and a retirement unit 218. While not specifically shown, it should be understood that one or more of the cores 114, 116 may have the same or similar configuration as the core 112. Each of the fetch unit 210, logic unit 212, registers 214, execution unit 216, and retirement unit 218 may be embodied as computer circuitry, e.g. as electronic components of a central processing unit of the core 112.

During operation of the computing device 100, the fetch unit 210 obtains instructions to be executed by the core 112 from the cache 118, the memory 120, and/or the storage 124. The logic unit 212 processes the instructions and converts them to a form that can be executed by the execution unit 216 (e.g. machine-level instructions). In accordance with the design of the transactional memory system 222, after instructions are successfully executed by the execution unit 216, the retirement unit 218 may commit and then retire the instructions (by de-allocating registers or updating the processor state, for example). The registers 214 may be used to store values that are involved in the processing and/or execution of the instructions, such as data values, pointer addresses, and/or trip counts.

In general, the translator 220 is configured to translate programmer-accessible computer instructions to an executable form that is compatible with the processor architecture. In the illustrative embodiments, the translator 220 adapts program code to run on a computer architecture that supports the transactional memory system 222. In other embodiments, which may include, for example, software transactional memory systems, the translator 220 may be embodied as a compiler, application programming interface (API), database management system, or the like, depending on the specific implementation.

The translator 220 includes an optimizer 226. Generally speaking, the optimizer 226 is configured to minimize or maximize one or more attributes of a computer program during execution of the program. As should be understood by those skilled in the art, there are many types of optimization that can be used, depending on the requirements of a particular application or system design. For example, some optimizers examine the program code to see if any sequences of computer instructions, in particular frequently-executed sequences, can be replaced with less code.

In the illustrative embodiments, the optimizer 226 identifies regions of code that require access to shared memory (e.g., code regions that include load or store instructions), and defines the regions of code as transactions. The optimizer 226 inserts checkpoint and commit instructions into the code regions as needed to define the transactions. In some embodiments, a binary translation dynamic optimizer, or similar device configured to optimize sequences of instructions as encountered and then cache the optimized instructions, may be used. In other embodiments, a static optimizer may be used.

The optimizer 226 may include the specializer 228 as a subcomponent, or the specializer 228 may be embodied as a separate component of the translator 220 as shown. The specializer 228 is configured to optimize a sequence of computer instructions for a commonly occurring condition. Whether or not a particular condition is considered to be commonly occurring may be determined in advance (e.g. by the programmer), or "on the fly" (e.g. as a result of previous executions of the computer instructions). Some examples of commonly occurring conditions for which it may be desirable to specialize computer instructions include runtime disambiguation checks (e.g., where code is specialized for the occurrence of a specific alias or no alias), value specialization (e.g., where code is specialized for the occurrence of a frequently occurring value of a variable, such as NULL), and loop multiversioning (e.g., where code is specialized for the occurrence of a particular loop trip count).

As described below in connection with FIGS. 3-6, the illustrative specializer 228 is configured to use the features of the transactional memory system 222 to optimize a sequence of computer instructions for a commonly occurring condition without introducing any new branch instructions.

The illustrative transactional memory system 222 is embodied as a hardware system that supports transactions, such as a restricted transactional memory (RTM) system. However, it should be understood that a software transactional memory system (STM) or other system that implicitly transfers control on exceptions may be used in other embodiments. The transactional memory system 222 includes checkpointing logic 230, transaction execution semantics 232, overflow logic 234, and an exception handler 236.

The checkpointing logic 230 includes computer instructions that are configured to interface with the optimizer 226 to establish the checkpoints and define code regions or transactions in a sequence of computer instructions. In addition, the checkpointing logic 230 may specify the action(s) to be taken in response to a checkpoint instruction. For example, the checkpointing logic 222 may initiate the storing of data relating to a particular state of the core 112 or other component of the computing device 100 in response to a checkpoint instruction.

The transaction execution semantics 232 include the semantics (e.g. instructions or code libraries) that can be used in program code to invoke and utilize the features of the transactional memory system 222. For example, the transaction execution semantics 232 enable the implicit transfer of control (e.g. to an interpreter or to native execution, depending on the system design) on exceptions. In the illustrative embodiment, the transaction execution semantics 232 include checkpoint, rollback, and commit semantics, as well as semantics for Boolean or bitwise logic, arithmetic, and invoking the exception handler 236.

The overflow logic 234 includes logic configured to specify action(s) to be taken if an overflow occurs (e.g., a value exceeds the maximum size that can be stored in the cache 118 or the memory 120). For example, the overflow logic 234 may store data relating to the state of the computing device 100 or a component thereof in response to an overflow event.

The exception handler 236 includes logic configured to determine action(s) to be taken if an exception is raised by an instruction obtained by the fetch unit 210. For example, the exception handler 236 may include logic configured to roll back the program execution to a previous checkpoint in a sequence of instructions and continue execution from the checkpoint, or to abort a transaction.

The arithmetic and logic unit (ALU) 224 includes an arithmetic unit 240 and a logic unit 242. The arithmetic unit 240 is configured to handle arithmetic operations such as add, subtract, divide, multiply, and/or others. The logic unit 242 is configured to handle Boolean and/or bitwise logic operations such as and, or, and exclusive-or operations.

Figure 3:
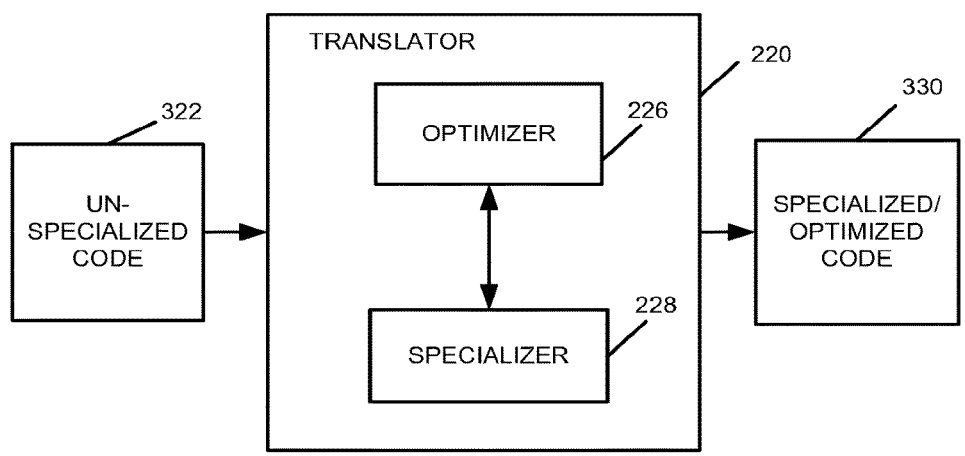
FIG. 3 is a simplified module diagram for at least one embodiment of a method for code specialization.

Referring now to FIG. 3, in operation, a sequence of computer instructions 322 is input to the translator 220. The instructions 322 are referred to as "unspecialized" code because they have not yet been processed by the optimizer 226 and/or specializer 228. After processing by the translator 220 (including the optimizer 226 and the specializer 228) as described herein, an optimized and/or specialized version 330 of the instructions 322 is produced. The optimized and/or specialized instructions 330 may be stored in the cache 118 until execution by the execution unit 216.

Figure 4:
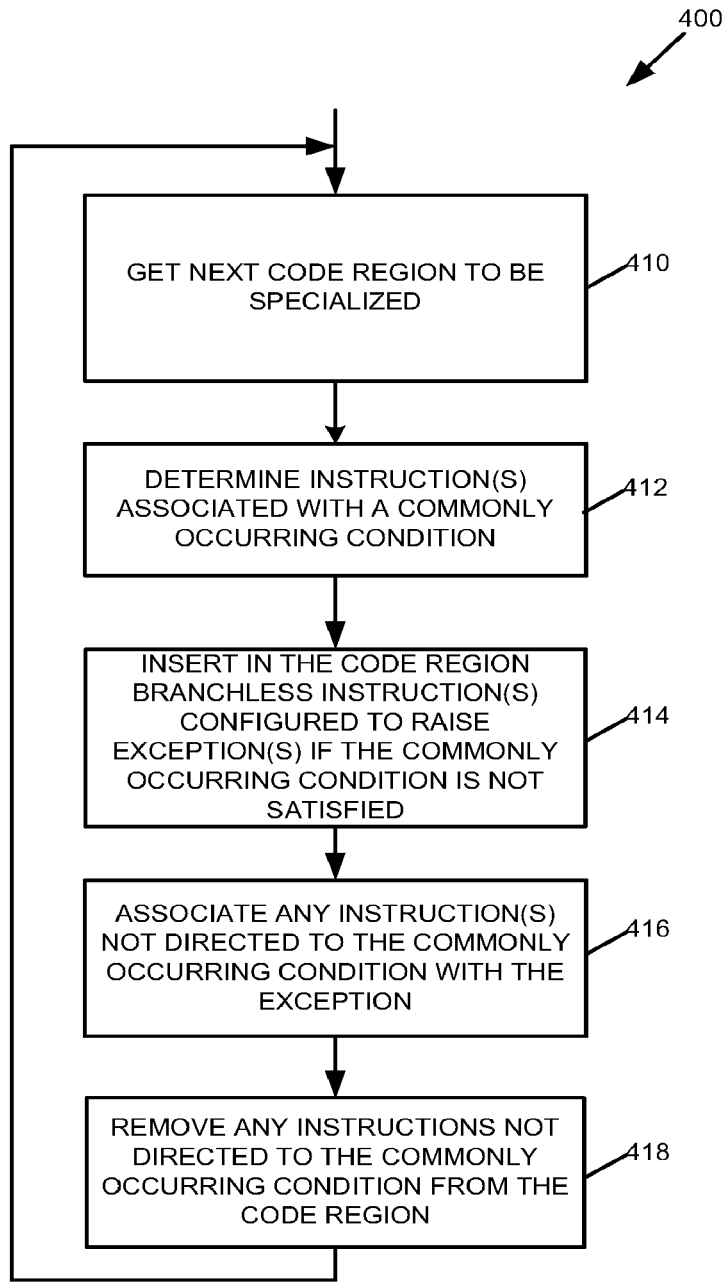
FIG. 4 is a simplified flow diagram of at least one embodiment of a method for code specialization.

Referring now to FIG. 4, an illustrative method 400 executable by the code specializer 228 is shown. At block 410, the method 400 obtains (e.g., from the cache 118 or the memory 120) one or more instructions that have been defined as a code region or transaction by the optimizer 226. For purposes of this disclosure, a "code region" may include a sequence of computer instructions determined by the translator 220 (e.g., the optimizer 226) to include at least one transaction. In other words, in some embodiments, a code region may include one or more transactions, while in other embodiments, a code region may include a single transaction.

In the illustrative embodiments, transactions are defined by a checkpoint instruction followed by a commit instruction. At block 412, the method 400 analyzes each transaction in the code region to determine which of the one or more instructions in the transaction are desired to be executable in response to a commonly occurring condition. To make this determination, the method 400 may consider whether there are certain instructions that are only executed if the commonly occurring condition is satisfied. Alternatively or in addition, the method 400 may determine that although all or multiple of the instructions in the transaction may be executed in response to the commonly occurring condition, it may be desirable to execute only certain of those instructions in response to the commonly occurring condition. This may be the case, for example, when portions of the code are optimized for different conditions.

At block 414, the method 400 inserts one or more branchless instructions into the code region. The branchless instructions are configured to preserve the normal program flow (e.g., without branching) for the commonly occurring condition. In the illustrative embodiments, the branchless instruction(s) include at least one instruction that is configured to raise an exception (and thereby invoke the exception handler 236) in response to the commonly occurring condition not being satisfied. The branchless instructions may include any form of non-branching logical and/or arithmetic operations that may be supported by the ALU 224. In other words, no compare and branch instructions are inserted into the code region as a result of block 414.

At block 416, the method 400 identifies any instructions in the code region that are not desired to be executable in response to the commonly occurring condition, and interfaces with the exception handler 236 to associate those instructions with an exception handling mechanism (e.g., a rollback or abort instruction), as may be appropriate for a particular application or design. In transactional memory systems and other systems that implicitly transfer control on exceptions, the transfer of control and execution of the instructions that are not executable in response to the commonly occurring condition is handled implicitly by the exception handler 236.

At block 418, the method 400 removes the instructions that are not desired to be executable in response to the commonly occurring condition (e.g., the instructions associated with the exception at block 416), from the code region. This can be done, for example, by inserting comment brackets around the instructions. The instructions may be removed entirely (e.g. so that the program aborts if an uncommonly occurring condition is encountered) or may be moved to another location in the sequential listing of the program code. In this way, a code region or transaction can be specialized so that it only contains code that is directed to the commonly occurring condition. Moreover, if the code that is desired to be executable in response to the commonly occurring condition has been optimized, the code region may only contain optimized code. Any code that is directed to the handling of uncommonly occurring conditions, or which is not desired to be executable in response to the commonly occurring condition, may remain un-optimized, or may be separately processed by the optimizer 226.

Figure 5:
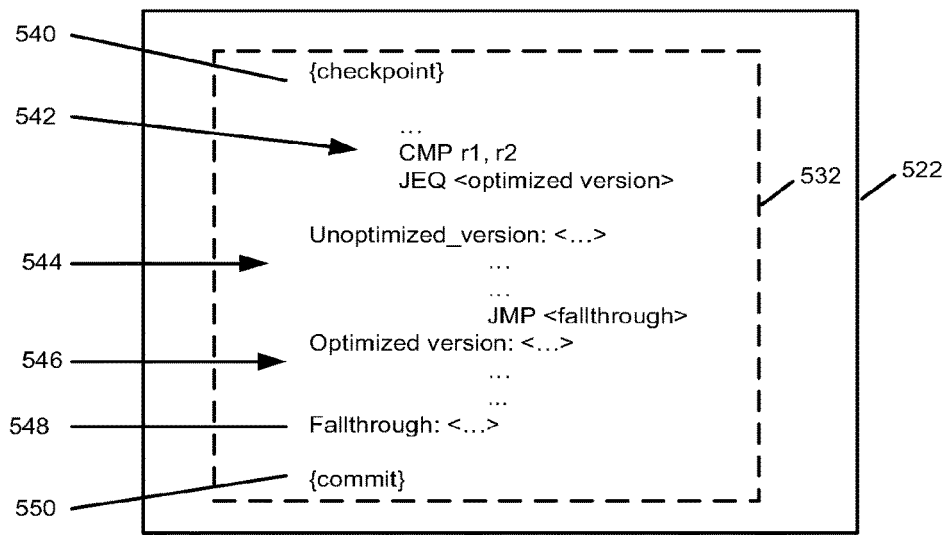
FIG. 5 is a simplified pseudo-code illustration of at least one embodiment of specialized computer instructions including a compare and branch instruction.

Referring now to FIG. 5, an example of a sequence of computer instructions 522 that has been specialized using a conventional code specialization technique is shown. The instructions 522 include a code region 532. Although not illustrated, it should be understood that the code 522 may include other computer instructions and/or code regions as well.

After processing using a conventional code specialization technique, the code region 532 is defined by a checkpoint instruction 540 followed sequentially by a commit instruction 550. Between the checkpoint instruction 540 and the commit instruction 550, compare and branch instructions 542 have been added to the code region 532. The compare and branch instructions 542 compare the data stored in two registers, r1 and r2. If the values stored in r1 and r2 are equal, the program execution skips over the instructions 544, which are configured to be executed if the commonly occurring condition is not satisfied, as indicated by the label, "Unoptimized version."

The program flow jumps to the "Optimized version" label and continues executing from there, the instructions 546, which are configured to be executed if the commonly occurring condition is satisfied. Once the instructions 546 have finished executing, the program flow proceeds to the commit instruction 550.

If the results of the compare and branch instructions 542 indicate that the data stored in r1 and r2 are not equal, then the program flow proceeds to execute the instructions 544. When the instructions 544 are finished executing, the program flow jumps to the Fallthrough label 548. As can be seen from the above example, branching takes place both when the commonly occurring condition (e.g., r1 equals r2) is satisfied and when an uncommonly occurring condition (e.g., r1 does not equal r2) is satisfied.

Figure 6:
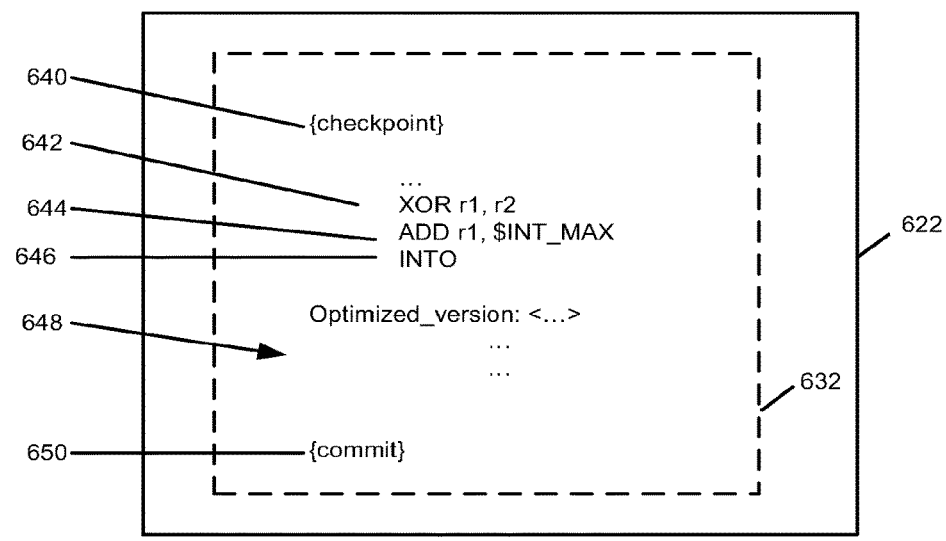
FIG. 6 is a simplified pseudo-code illustration of at least one embodiment of specialized computer instructions not including any compare and branch instructions.

Referring now to FIG. 6, a sequence of computer instructions 622 comprising a code region 632 is shown after having been processed by the specializer 228 as disclosed herein. The remainder of the sequence of instructions (e.g. the portion of the sequence of instructions 622 outside of the code region 632) may remain unaffected by the processing of the code region 632, or may be altered by the processing of the code region 632. For example, instructions configured to be executed in response to the occurrence of an uncommon condition may be removed from the code region 632 and placed elsewhere in the sequence of instructions 622.

The specialized code region 632 does not include any compare and branch instructions. The specialized code region 632 is defined by a checkpoint instruction 640 and a commit instruction 650. Between the checkpoint instruction 640 and the commit instruction 650, a sequence of exception generating instructions 642, 644, 646 is inserted into the code region 632. In the illustrated example, the exception generating instructions 642, 644, 646 include a Boolean or bitwise logic instruction (642), an arithmetic function (644), and an exception raising instruction 646.

More specifically, in the illustrated example, an exclusive-or (XOR) function is used to compare data stored in the registers r1 and r2. If the data stored in r1 and r2 are equal, the result of the XOR function will be zero and the value zero will be stored in r1. An addition function (e.g., ADD) adds the value of r1 to the maximum allowable integer (e.g., $INT_MAX). If the value of r1 is anything other than zero, an overflow flag will be set because the sum of r1 and $INT_MAX will be greater than the maximum allowable integer.

An exception raising instruction (e.g., INTO) raises an exception, invoking the exception handler 236, if the overflow flag is set. If the overflow flag is not set, then the data stored in the registers r1 and r2 are equal and the program flow continues uninterrupted and without branching, to the sequence of instructions that are optimized for the commonly occurring condition (which is, in this example, that r1 and r2 are equal). For example, in some embodiments, an NOP (no operation performed) instruction may be issued if the overflow flag is not set. Following execution of the instructions for the commonly occurring condition, the program flow proceeds to the commit instruction 650.

If the overflow flag is set, thereby indicating that an uncommonly occurring condition has been satisfied, the exception handler 236 may be configured to roll back the transaction and/or redirect the program flow to the location of the instructions to be executed in the case of an uncommonly occurring condition, or may abort the transaction.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of a hardware-based transactional memory system, it will be understood that the various aspects have other applications, for example, any application in which it is desired to specialize program code for one or more commonly occurring conditions where the features of a transaction memory system, or other system that implicitly transfers control on exceptions, are available. (e.g., hardware and/or software-based transactional systems). Such applications may include, for example, compilers, system or application software, and/or database systems.

The invention claimed is:

1. At least one non-transitory computer accessible medium comprising a plurality of instructions that in response to being executed result in a computing device:
    analyzing a sequence of computer instructions;
    executing a code specialization routine configured to identify at least one code region of the sequence of computer instructions, the at least one code region being executable as a transaction by a transactional memory system of the computing device;
    inserting in a code region of the at least one code region at least one branchless instruction configured to determine if a commonly occurring condition is satisfied; and
    inserting in the code region at least one exception generating instruction configured to raise an exception in response to the commonly occurring condition not being satisfied.

2. The at least one non-transitory computer accessible medium of claim 1, wherein the at least one branchless instruction comprises a bitwise logic operation and an arithmetic operation.

3. The at least one non-transitory computer accessible medium of claim 2, wherein the bitwise logic operation is an exclusive-or (XOR) instruction and the at least one exception generating instruction comprises setting an overflow flag.

4. The at least one non-transitory computer accessible medium of claim 1, wherein the at least one code region is defined by a checkpoint instruction and a commit instruction.

5. The at least one non-transitory computer accessible medium of claim 4, wherein the at least one code region comprises at least one first instruction executable in response to the commonly occurring condition being satisfied and at least one second instruction executable in response to the commonly occurring condition not being satisfied.

6. The at least one non-transitory computer accessible medium of claim 5, wherein the plurality of instructions further cause the computing device to remove the second instruction from the at least one code region.

7. The at least one non-transitory computer accessible medium of claim 1, wherein the at least one exception generating instruction comprises an instruction that raises an exception in response to a determination that an over-flow flag is set.

8. A method comprising:
    analyzing, by a computing device, a sequence of computer instructions;
    executing, by the computing device, a code specialization routine configured to identify at least one code region of the sequence of computer instructions, the at least one code region being executable as a transaction by a transactional memory system of the computing device;
    inserting, by the computing device and in a code region of the at least one code region, at least one branchless instruction configured to determine if a commonly occurring condition is satisfied; and
    inserting, by the computing device, in the code region at least one exception generating instruction configured to raise an exception in response to the commonly occurring condition not being satisfied.

9. The method of claim 8, wherein the at least one branchless instruction comprises a bitwise logic operation and an arithmetic operation.

10. The method of claim 9, wherein the bitwise logic operation is an exclusive-or (XOR) instruction and the at least one exception generating instruction comprises setting an overflow flag.

11. The method of claim 8, wherein the at least one code region is defined by a checkpoint instruction and a commit instruction.

12. The method of claim 11, wherein the at least one code region comprises at least one first instruction executable in response to the commonly occurring condition being satisfied and at least one second instruction executable in response to the commonly occurring condition not being satisfied.

13. The method of claim 8, wherein the at least one exception generating instruction comprises an instruction that raises an exception in response to a determination that an over-flow flag is set.

14. A computing device comprising:

a processor; and at least one memory having stored therein a plurality of instructions that, when executed, cause the computing device to:

analyze a sequence of computer instructions;

execute a code specialization routine configured to identify at least one code region of the sequence of computer instructions, the at least one code region being executable as a transaction by a transactional memory system of the computing device;

insert, in a code region of the at least one code region, at least one branchless instruction configured to determine if a commonly occurring condition is satisfied; and insert in the code region at least one exception generating instruction configured to raise an exception in response to the commonly occurring condition not being satisfied.

15. The computing device of claim 14, wherein the at least one branchless instruction comprises a bitwise logic operation and an arithmetic operation.

16. The computing device of claim 15, wherein the bitwise logic operation is an exclusive-or (XOR) instruction and the at least one exception generating instruction comprises setting an overflow flag.

17. The computing device of claim 14, wherein the at least one code region is defined by a checkpoint instruction and a commit instruction.

18. The computing device of claim 17, wherein the at least one code region comprises at least one first instruction executable in response to the commonly occurring condition being satisfied and at least one second instruction executable in response to the commonly occurring condition not being satisfied.

19. The computing device of claim 14, wherein the at least one exception generating instruction comprises an instruction that raises an exception in response to a determination that an over-flow flag is set.

* * * * *